United States Patent
Chou

(10) Patent No.: US 8,269,643 B2
(45) Date of Patent: Sep. 18, 2012

(54) POSITIONING/NAVIGATION SYSTEM USING IDENTIFICATION TAG AND POSITION/NAVIGATION METHOD

(75) Inventor: Feng-Jian Chou, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 415 days.

(21) Appl. No.: 12/538,917

(22) Filed: Aug. 11, 2009

(65) Prior Publication Data

US 2010/0127883 A1 May 27, 2010

(30) Foreign Application Priority Data

Nov. 27, 2008 (TW) .............................. 97146056 A

(51) Int. Cl.
*G08B 21/00* (2006.01)
*G08B 13/14* (2006.01)
(52) U.S. Cl. .................... 340/686.1; 340/572.1
(58) Field of Classification Search ............... 340/686.1
See application file for complete search history.

(56) References Cited

U.S. PATENT DOCUMENTS

| | | | | | |
|---|---|---|---|---|---|
| 6,049,745 | A * | 4/2000 | Douglas et al. | ................. | 701/23 |
| 6,337,627 | B1 * | 1/2002 | Von Gutfeld et al. | ...... | 340/572.1 |
| 6,611,673 | B1 * | 8/2003 | Bayley et al. | ................. | 455/564 |
| 6,791,452 | B2 * | 9/2004 | Fletcher et al. | .............. | 340/10.6 |
| 7,030,731 | B2 * | 4/2006 | Lastinger et al. | ........... | 340/10.1 |
| 7,701,342 | B2 * | 4/2010 | Chen et al. | .................. | 340/572.1 |
| 2006/0022825 | A1 * | 2/2006 | Carrender | ................... | 340/572.1 |
| 2006/0265123 | A1 * | 11/2006 | Chon et al. | ..................... | 701/209 |
| 2008/0284600 | A1 * | 11/2008 | Drzaic et al. | ............... | 340/572.1 |
| 2009/0043502 | A1 * | 2/2009 | Shaffer et al. | ................. | 701/213 |

FOREIGN PATENT DOCUMENTS

| | | |
|---|---|---|
| CN | 1771426 | 5/2006 |
| CN | 101144722 | 3/2008 |

OTHER PUBLICATIONS

State Intellectual Property Office of the People'S Republic of China, "Office Action", Mar. 22, 2011, China.
China Patent Office Action Issued on Dec. 23, 2011.

\* cited by examiner

*Primary Examiner* — Daniel Wu
*Assistant Examiner* — Mohamed Barakat
(74) *Attorney, Agent, or Firm* — WPAT, PC; Justin King

(57) ABSTRACT

A positioning navigation system using identification tags and a method thereof is provided. The system and method are applied to an area having a plurality of identification tags to position and navigate a mobile apparatus. The system includes a plurality of identification tags and a mobile apparatus. The method includes steps of accessing unique position data stored in at least one identification tag and generating position information of the mobile apparatus according to the unique position data stored in the at least one identification tag and a geographic data of the area. The unique position data of each identification tag corresponds to a coordinate position of the geographic data of each identification tag within the area.

5 Claims, 8 Drawing Sheets

POSITIONING/NAVIGATION SYSTEM USING IDENTIFICATION TAG AND POSITION/NAVIGATION METHOD

CROSS REFERENCE TO RELATED PATENT APPLICATION

This patent application is based on a Taiwan, R.O.C. patent application No. 97146056 filed on Nov. 27, 2008.

FIELD OF THE INVENTION

The present invention relates to a positioning navigation system using identification tags and a positioning navigation method thereof, and more particularly, to a positioning navigation system capable of data access by radio frequency identification technology and positioning navigation with respect to positions of radio identification tags.

BACKGROUND OF THE INVENTION

As electronic digital technology develops continuously, electronic apparatuses or electronic products with various different application functions are frequently applied in our daily life. For example, the development of mobile computing technology provides portable electronic apparatuses or mobile computing apparatuses, such as mobile phones, smart phones, personal digital assistants (PDA), or laptops, thereby providing rather great user convenience and various utilities.

In addition, a navigation function is widely used in a standalone device or integrated within other portable devices. A common example is a global positioning system (GPS) receiving signals from various satellites and computing position information according to the signals, and displaying the position in the corresponding map. For example, the position information is a longitude and latitude data, or a coordinate data corresponding to a predetermined map. Regardless of the navigation apparatus is set in a moving vehicle or held by a moving person, the navigation apparatus loads a relevant electronic map data, continuously computes a current position according to GPS signals, and then shows the position with the map on the monitor in real-time.

Furthermore, since the navigation apparatus has high computing capabilities along with a large capacity memory and an accurate electronic map, the apparatus is able to provide the navigation function to find the best route from the starting position to a specified destination based on the received GPS signals and the electronic map data. Information of the destination is entered via a user interface, then the navigation apparatus computes, plans, and acquires a suitable walking or driving route, so as to guide the user to successfully travel from an origin to the destination according to the planned route. Based on the planned route, a direction indication displayed in a two/three-dimensional (2D/3D) map allows an user to instinctively arrive to the destination.

However, the present GPS technology does have several shortcomings. Because the GPS signals could not be received in indoor, the conventional GPS technology can only be applied outdoors, such as to identify or to position streets, traffic, and terrestrial, or any geographical objects. The conventional GPS technology could not be used indoors, such as to identify or to position an indoor exhibition area, a large-scale exhibition hall, a museum, a supermarket, or a shopping mall. It is important and necessary to provide a proper route navigation service to a visitor for the reason that the area is rather large such that the visitor needs a guide. In addition, a general public electronic map is not able to display the map information or object information for the room or building, and hence a general navigation apparatus does not provide the indoor navigation function.

Furthermore, with respect to operations in a vertical direction between different floors, the present GPS technology generates great errors in performing positioning function. Moreover, for a large-scale factory having a complicated layout environment, an automated machine has to move on a predetermined route and need to have a highly accurate positioning and navigation capability to produce the route. The conventional GPS technology is hard to solve the abovementioned problem.

Therefore, one main object of the present invention is to provide a positioning navigation apparatus and method to solve the problem.

SUMMARY OF THE INVENTION

One object of the present invention is to provide a positioning navigation system using identification tags and a positioning navigation method thereof. By integrating a data access function of radio frequency identification (RFID) technology and a design of positioning the locations of the identification tags, a user can obtain a current position within an area and a navigation service is further provided.

A positioning navigation system using identification tags is provided according to the present invention. The system is applied to an area having a plurality of identification tags to position and navigate a mobile apparatus. The system comprises a plurality of identification tags and a mobile apparatus. The identification tags are provided at different locations within a designated area, and each identification tag stores an unique position data. The mobile apparatus comprises an identification tag reading module, a memory and a processing module. The identification tag reading module accesses the unique position data of at least one identification tag. The memory stores a geographic data of the area. The processing module coupled to the identification tag reading module and the memory generates position information of the mobile apparatus according to the unique position data of the at least one identification tag and the geographic data of the area. The unique position data of each identification tag corresponds to a coordinate position of the geographic data of each identification tag within the area.

A positioning navigation method using identification tags is provided according to the present invention. The method is applied to a positioning navigation system using identification tags. The system comprises a mobile apparatus and a plurality of identification tags provided in an area. The method comprises steps of accessing an unique position data of at least one identification tag, and generating mobile apparatus position information according to the unique position data of the at least one identification tag and a geographic data of the area. The unique position data of each identification tag corresponds to a coordinate position of the geographic data of each identification tag within the area.

BRIEF DESCRIPTION OF THE DRAWINGS

Following description and figures are disclosed to gain a better understanding of the advantages of the present invention.

DETAILED DESCRIPTION OF THE PREFERRED EMBODIMENT

Figure 1:
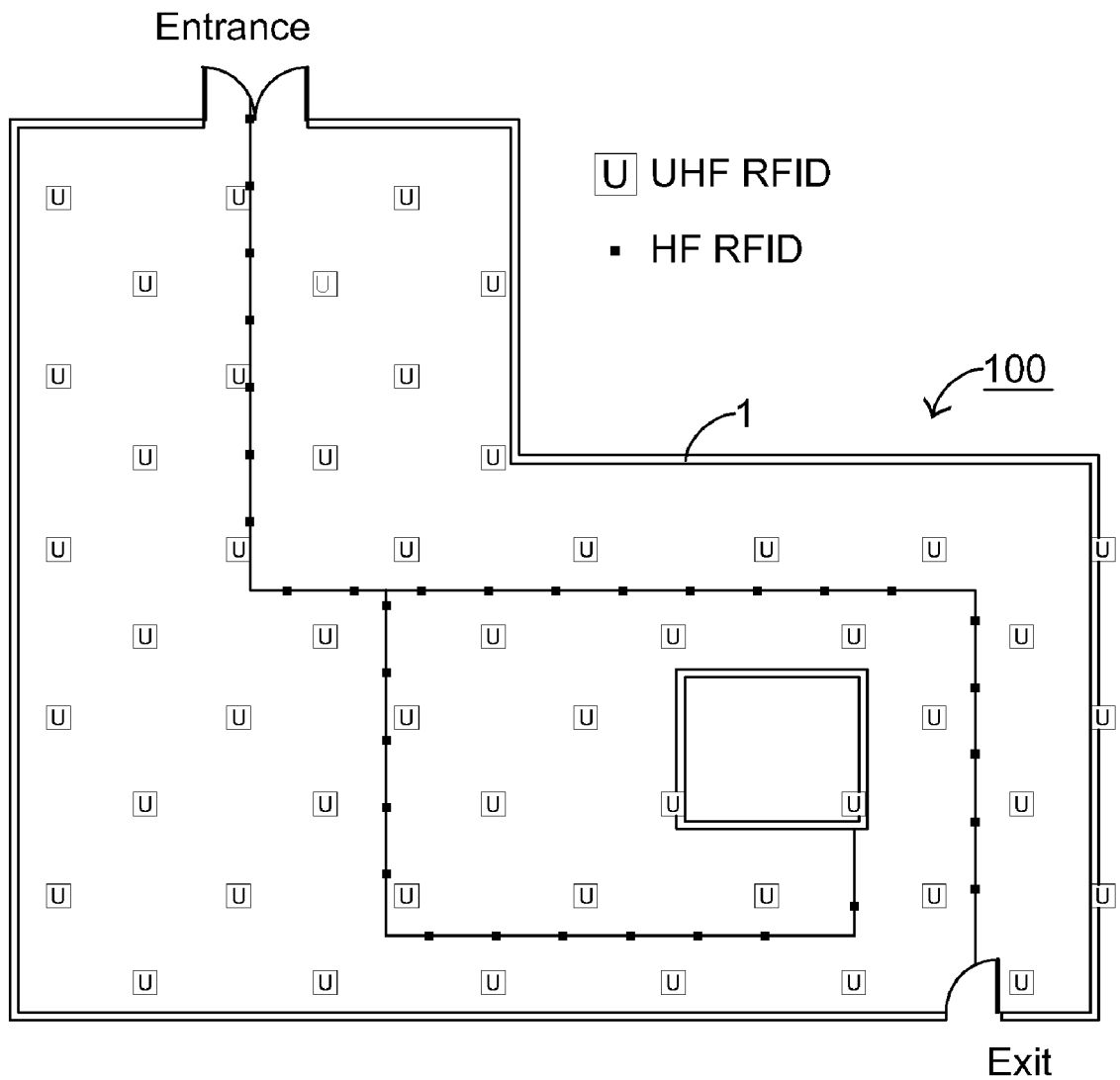
FIG. 1 is a schematic diagram of an identification tag positioning and navigation system 100.

FIG. 1 is a schematic diagram of an identification tag positioning and navigation system 100. The identification tag positioning and navigation system 100 comprises a mobile apparatus (not shown in FIG. 1) and a plurality of identification tags using the RFID technology. According to the present invention, the identification tag positioning and navigation system 100 is applied to an indoor area 1, and the identification tags are provided in the indoor area 1 as well. Referring to FIG. 1, the identification tags comprises a first class of identification tags shown as larger white blocks, and a second class of identification tags shown as smaller black blocks. The first class of identification tags is produced according to an access specification based on a first radio frequency (RF). In a preferred embodiment, the first class RF is allocated in the ultra high frequency (UHF) band. The second class of identification tags is produced according to an access specification based on a second RE In a preferred embodiment, the second class RF is allocated in the high frequency (HF) band.

The identification tag positioning and navigation system 100 comprises electronic tags integrating the RFID technology and a mobile apparatus capable of accessing the identification tags. The mobile apparatus could access signals generated from various kinds of RF identification. As mentioned above, in a preferred embodiment, the mobile apparatus could access signals of the RF identifications via the first RF (UHF) and the second RF (HF).

The identification tags in the indoor area 1 are provided as shown in FIG. 1. The first class of the identification tags is properly distributed in the indoor area 1; that is, a proper and predetermined distance exists between the tags, such as 3 to 5 meters. In addition, the second class of the identification tags is arranged tightly one next to another in the length as 3 to 5 centimeters within the indoor area 1 to form a route. Thus, two predetermined routes are formed as shown in FIG. 1. Therefore, identification tags within an effective reading distance may be detected and scanned according to a signal frequency range operated by the mobile apparatus. When scanning at the first RF (UHF), the positioning and navigation system according to an embodiment of the present invention can detect a plurality of the first class of the identification tags within several meters. When scanning at the second RF (HF), the positioning and navigation system according to an embodiment of the present invention can detect one or a plurality of the second class of the identification tags within several centimeters.

The mobile apparatus according to the present invention may be implemented on two embodiments, for example. One embodiment is a portable electronic apparatus, such as a mobile phone, a smart phone, a personal digital assistant (PDA), or a laptop. The portable electronic apparatus can be held and moved in the indoor area 1 by a user. The other embodiment is an automation machine, such as a device having an automated motion capability, an unmanned operation machine, or vehicle and so on. The automation machine can move automatically on a predetermined route of the indoor area 1.

In one embodiment of the present invention, a positioning and navigation system is applied to an indoor space, such as an exhibition area, a museum, a supermarket, or a shopping mall, so as to provide a positioning service to a user or a visitor holding a mobile apparatus. In another embodiment of the present invention, a mobile apparatus having an automated motion capability moves accurately on a predetermined route in a common large-scale factory building or an area having a highly complicated layout environment. In the two foregoing applications, identification tags are set on the floor, and the surface of the wall, a pillar, or any object, so the mobile apparatus can scan, access, and identify a signal from any identification tag.

Figure 2:
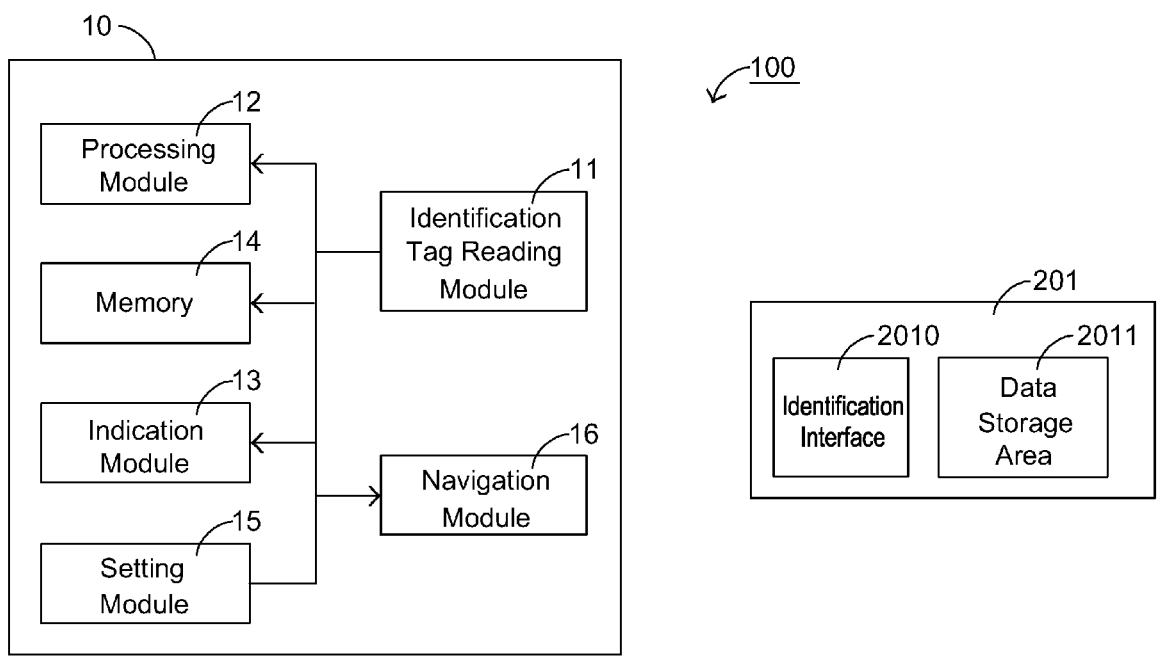
FIG. 2(a) is a block diagram of the identification tag positioning and navigation system 100.
FIG. 2(b) is a format of an identification tag in accordance with an embodiment of the present invention.
Figure 2:
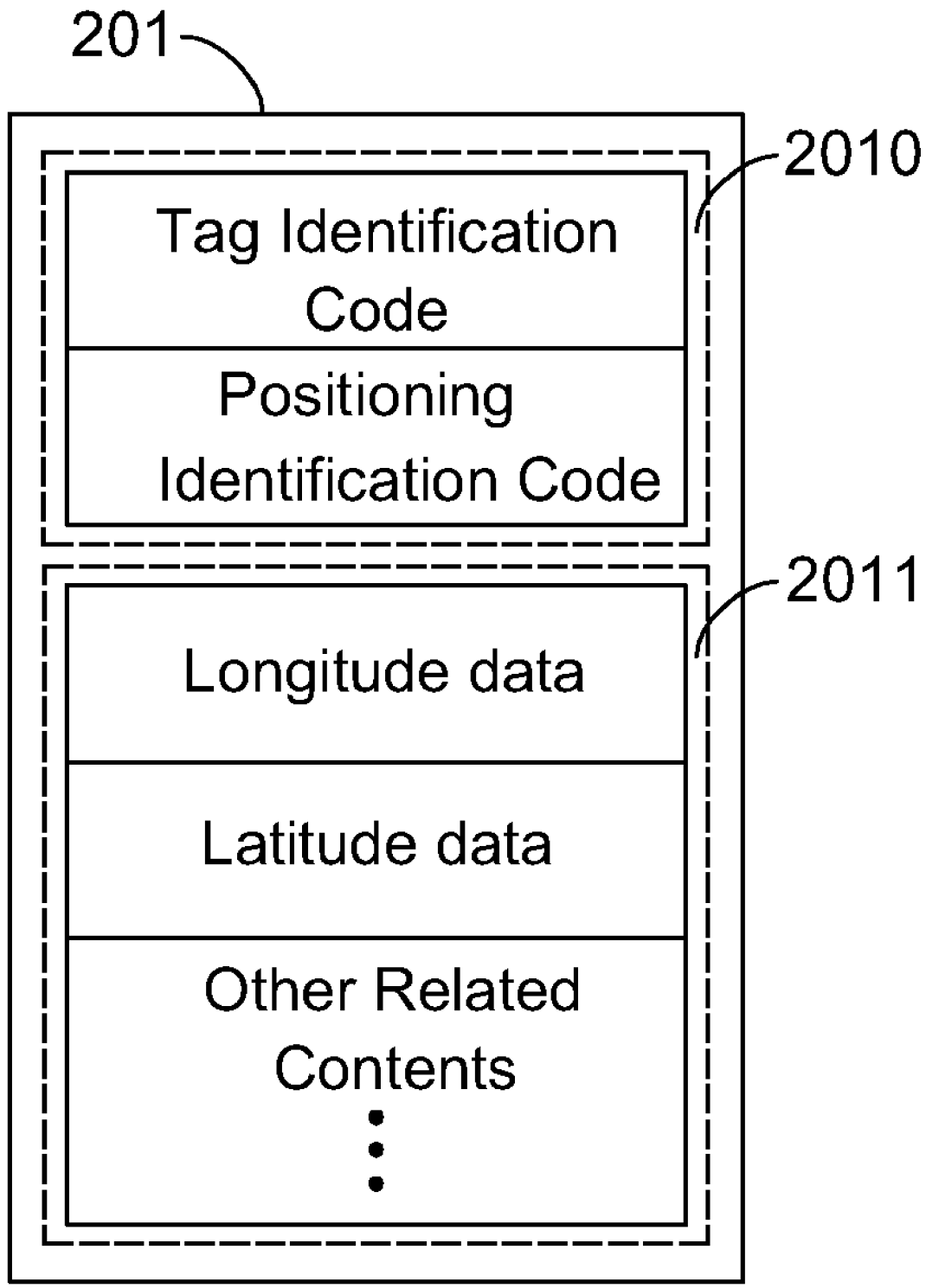

FIG. 2(a) is a block diagram of an identification tag positioning and navigation system 100. A mobile apparatus 10 of the system access and identify these identification tags by the RFID technology. Take an identification tag 201 in FIG. 2(a) as an example. The mobile apparatus 10 comprises an identification tag reading module 11, a processing module 12, an indicating module 13, a memory 14, a setting module 15, and a navigation module 16. The identification tag 201 comprises a data storage area 2011 and an identification interface 2010. The data storage area 2011 is used for storing an unique position data related to a real position of the identification tag 201. According to the present invention, the data storage area 2011 of each identification tags is used for storing unique position information in the indoor area 1. The identification interface 2010 is used for identification verification by the identification tag reading module 11. The purpose is for determining whether to allow the mobile apparatus 10 to access information of the identification tag.

FIG. 2(b) is a format of an identification tag in accordance with an embodiment of the present invention. Taking the identification tag 201 as an example, the identification interface 2010 comprises a unique tag identification code for distinguishing from other tags. The unique tag identification code has 8 bits. The identification interface 2010 further comprises a positioning identification code used in an identification tag positioning and navigation method according to the present invention. The positioning identification code having 4 bits is used for identifying the purpose of the identification tag 201. A public format is used for identifying the identification tag 201; that is, no encryption process is needed to perform a data access.

The data stored in the data storage area 2011 is a longitude data and a latitude data of the identification tag 201. The longitude data and the latitude data respectively have 4-bit blocks, and other related contents are recorded according to the capacity of the data storage area 2011. The unique position data of the identification tag of the present invention is represented by longitude and latitude, a specific coordinate system is also used for defining a coordinate position of the identification tag. Such coordinate position is defined by a manager of the indoor area 1. For example, a height data of the coordinate position of a certain marketplace is represented by the floor number of the marketplace.

Figure 3:
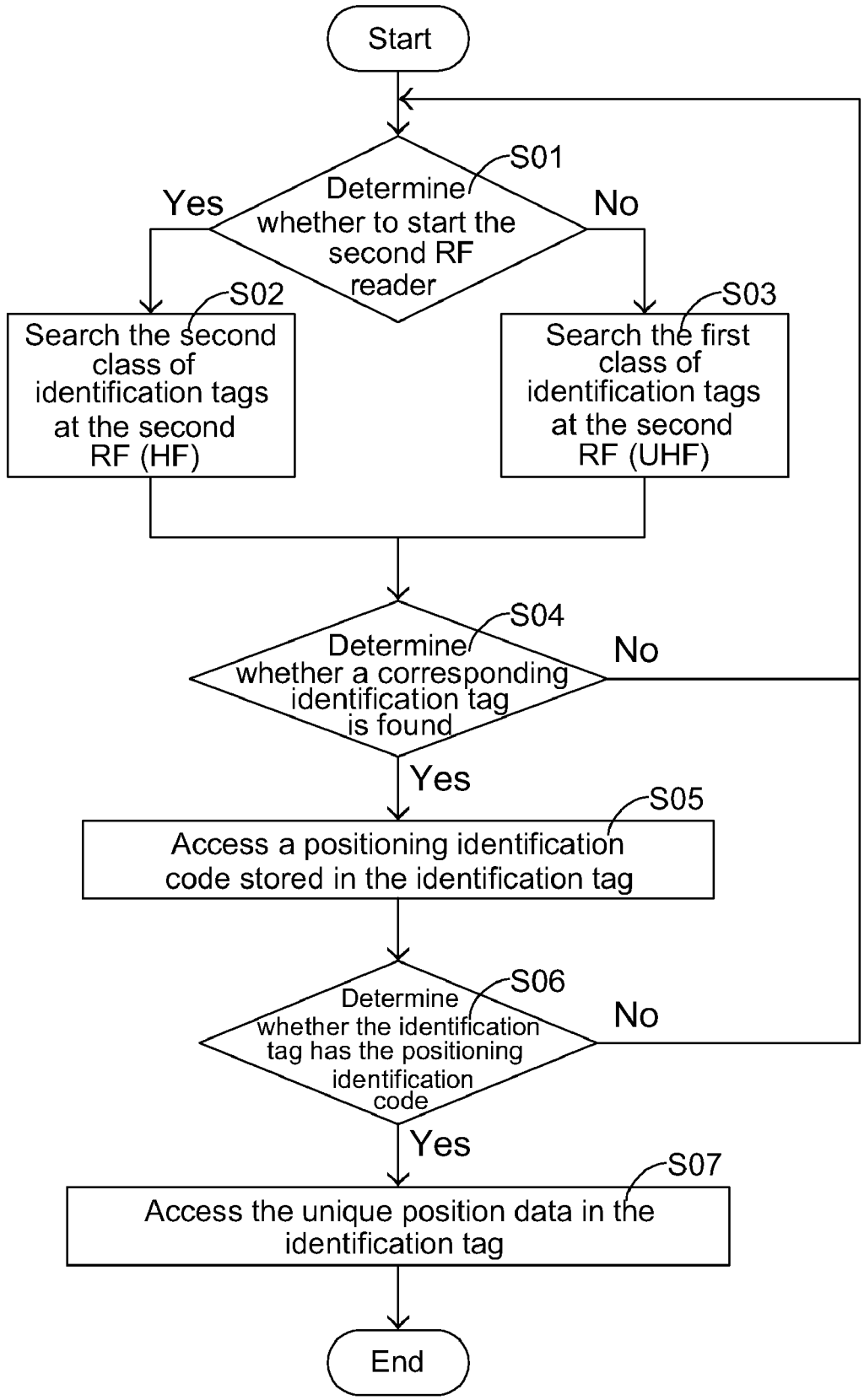
FIG. 3 is a flow chart of a tag access process in accordance with an embodiment of the present invention.

As mentioned above, in an environment, the RFID identification tags may have various types or a great number of applications. Accordingly, whether an identification object is an identification tag as needed is determined via an access and identification flow as shown in FIG. 3. In Step S01, an RF to be operated by a mobile apparatus is determined according to an application purpose. When a second RF (HF) is determined, Step S02 is performed; otherwise, Step S03 is performed. In Step S02, the mobile apparatus generates a signal of the second RF (HF) to correspondingly access a second class of identification tags. In Step S03, the mobile apparatus generates a signal of the first RF (UHF) to correspondingly access a first class of identification tags. With respect to the determination of Step S01, the mobile apparatus is designed to alternately apply the first RF (UHF) or the second RF (HF) for accessing the identification tags in a preferred embodiment—such design is dependent on a practical application of the embodiment.

In Step S04, a response from the identification tags is received to determine whether a corresponding identification tag is found. When the corresponding identification tag is found, Step S05 is performed; otherwise, the method returns to Step S01. In Step S05, the mobile apparatus accesses a positioning identification code stored in the identification tag as found. In Step S06, whether the identification tag has the positioning identification code is determined. An affirmative result from Step S06 means that the identification tag is designed for a positioning purpose according to the present invention. Otherwise, the method returns to Step S01. In Step S07, only when the identification tag is identified as being used for the positioning purpose, the mobile apparatus accesses an unique position data stored in the identification tag. The mobile apparatus is provided in the indoor area 1 shown in FIG. 1, or near an exit or an entrance of the indoor area 1.

Figure 4:
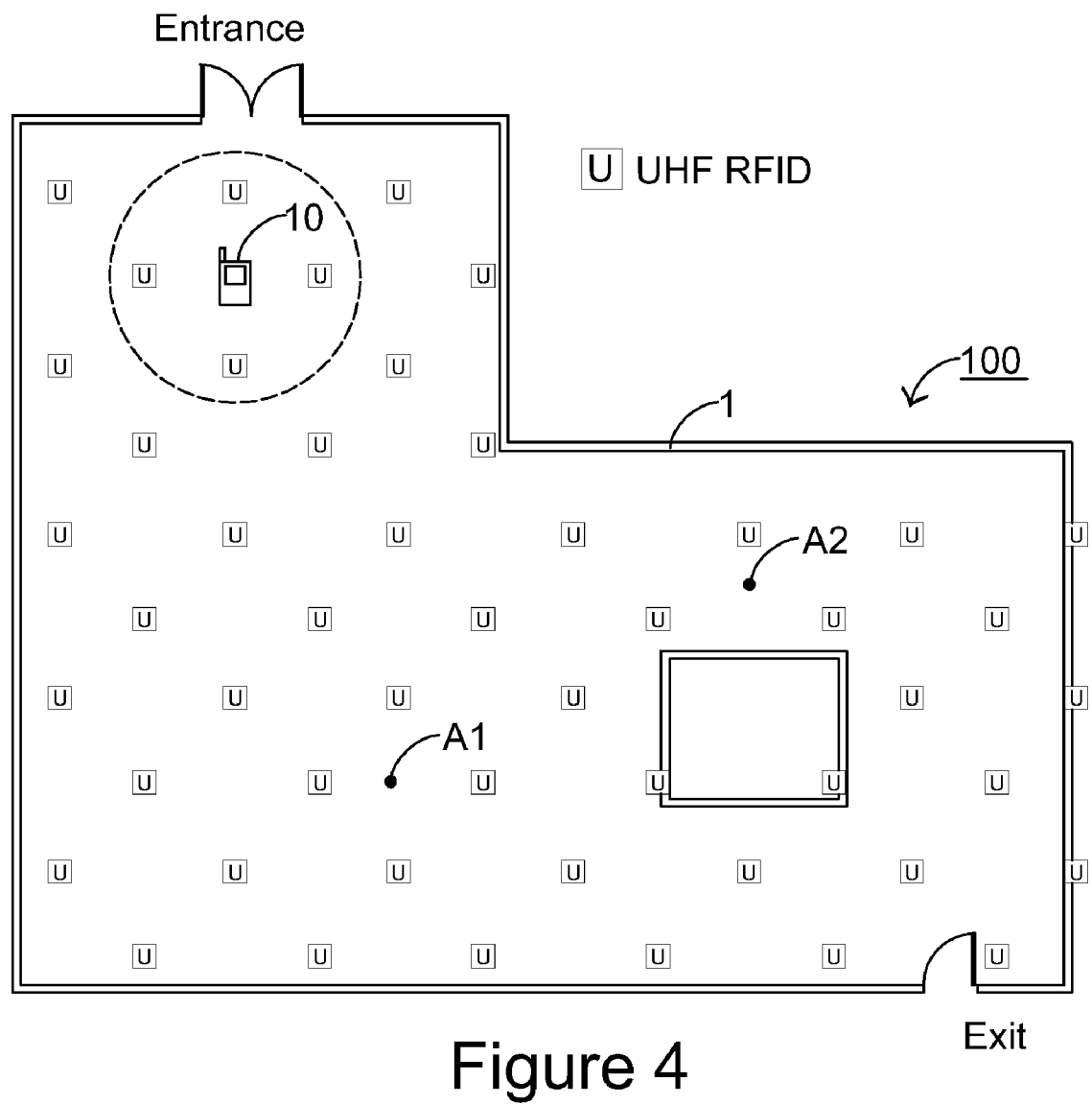
FIG. 4 is a schematic diagram of the identification tag positioning and navigation system 100 in accordance with a first embodiment of the present invention.

Take a first embodiment to describe an application of the identification tag positioning and navigation method according to the present invention. For example, the method is applied in an indoor area such as an exhibition area, a museum, a marketplace, or a shopping mall, so as to provide position information and a best route navigation service to a user holding a mobile apparatus. Refer to FIG. 4 showing a schematic diagram of the identification tag positioning and navigation system 100 in accordance with the first embodiment of the present invention. The user holding the mobile apparatus 10 is in the indoor area 1. When the user wishes to know a current position also regarded as a position of the mobile apparatus 10, the mobile apparatus 10 operating at the first RF (UHF) accesses the first class of the identification tags stored in the indoor area 1. The identification tag reading module 11 of the mobile apparatus 10 transmits an access signal within a range. Therefore, one or several identification tags of the first class corresponding to the range may be accessed by the mobile apparatus 10 hold by the user.

Referring to a dashed circle in FIG. 4, four of the first class of the identification tags are detected and unique position data stored in each of the four identification tags are accessed. According to the present invention, the memory 14 of the mobile apparatus 10 stores a geographic data corresponding to the indoor area 1. In this embodiment, the processing module 12 of the mobile apparatus 10 accesses the unique position data of the four identification tags and generates position information of the mobile apparatus 10 according to the geographic data and the four position data. More particularly, an unique position data of one of the four identification tags represents a coordinate position of the identification tag according to the geographic data. The processing module 12 of the mobile apparatus 10 then averages the unique position data of the four identification tags. The average calculation is a statistical method such as an interpolation method, a heterodyning method, a weight value method, and so on. The average result is regarded as current position information of the mobile apparatus 10.

Moreover, the indicating module 13, such as a display screen, of the mobile apparatus 10, is used for displaying a map of the geographic data corresponding to the indoor area 1. The position information of the mobile apparatus 10 is marked on the map according to a coordinate to acquaint the user with the current position. In addition, when only one identification tag is accessed by the identification tag reading module 11, for example, when the user is near the exit or the entrance or at the edge of the indoor area 1, the processing module 12 according to the present invention directly regards the unique position data of the identification tag as the position information of the mobile apparatus 10. That is, the current position of the mobile apparatus 10 is regarded as the position of the identification tag. The positioning result in this scenario does not exactly reflect a practical situation; however, the current position is also effectively provided to the user via the marks on the map for the reason that a scan range of the first RF (UHF) is about several meters.

In the first embodiment, only the positioning information of the first class of identification tags is used, and the identification tags are distributed at an interval of several meters. While moving the mobile apparatus 10, the user can voluntarily choose a proper motion distance and actively avoid obstacles in the indoor area 1. Moreover, the identification tag reading module 11 continuously transmits signals to search and to access corresponding identification tags, so as to continuously generate current position information to be marked on the map. Therefore, the user can obtain the current position at any time. Density on distribution of the first class of identification tags in the indoor area 1 may be increased to improve positioning accuracy of the mobile apparatus 10. In another embodiment of the present invention, the second class of the identification tags is provided in the indoor area 1 to increase the accuracy to a centimeter level.

Consequently, in the first embodiment, when the user moves, the mark representing the current position of the mobile apparatus 10 shall be correspondingly changed on the map, so as to indicate a motion direction or a route of the user. For example, the motion direction or the route is shown as an arrow on the map. The map can be a 2D/3D visual map to show the real space and the user can know the real motion according to the map. Furthermore, the mobile apparatus 10 according to the present invention provides a navigation service.

For example, the user uses the setting module 15 of the mobile apparatus 10, such as a graphic interface or multiple direction buttons, to set a destination data corresponding to the displayed map. The navigation module 16 of the mobile apparatus 10 generates navigation information according to the destination data, position information of the mobile apparatus 10, and the geographic data of the indoor area 1. The navigation information is associated with a route from a current position to a destination position. The navigation module 16 further generates indication information according to the navigation information, and the indicating module 13 indicates a corresponding direction according to the indication information. In a preferred embodiment, a screen is used for displaying a direction with the arrow, and a speaker is used for generating an audio instruction. For instance, when the user wishes to find the exit of the indoor area 1 and the user is at a position A1 as shown in FIG. 4, an audio instruction of "turn right at the path ahead" is transmitted, or an audio instruction of "turn left at the path ahead" is transmitted when the user is at a position A2.

Figure 5:
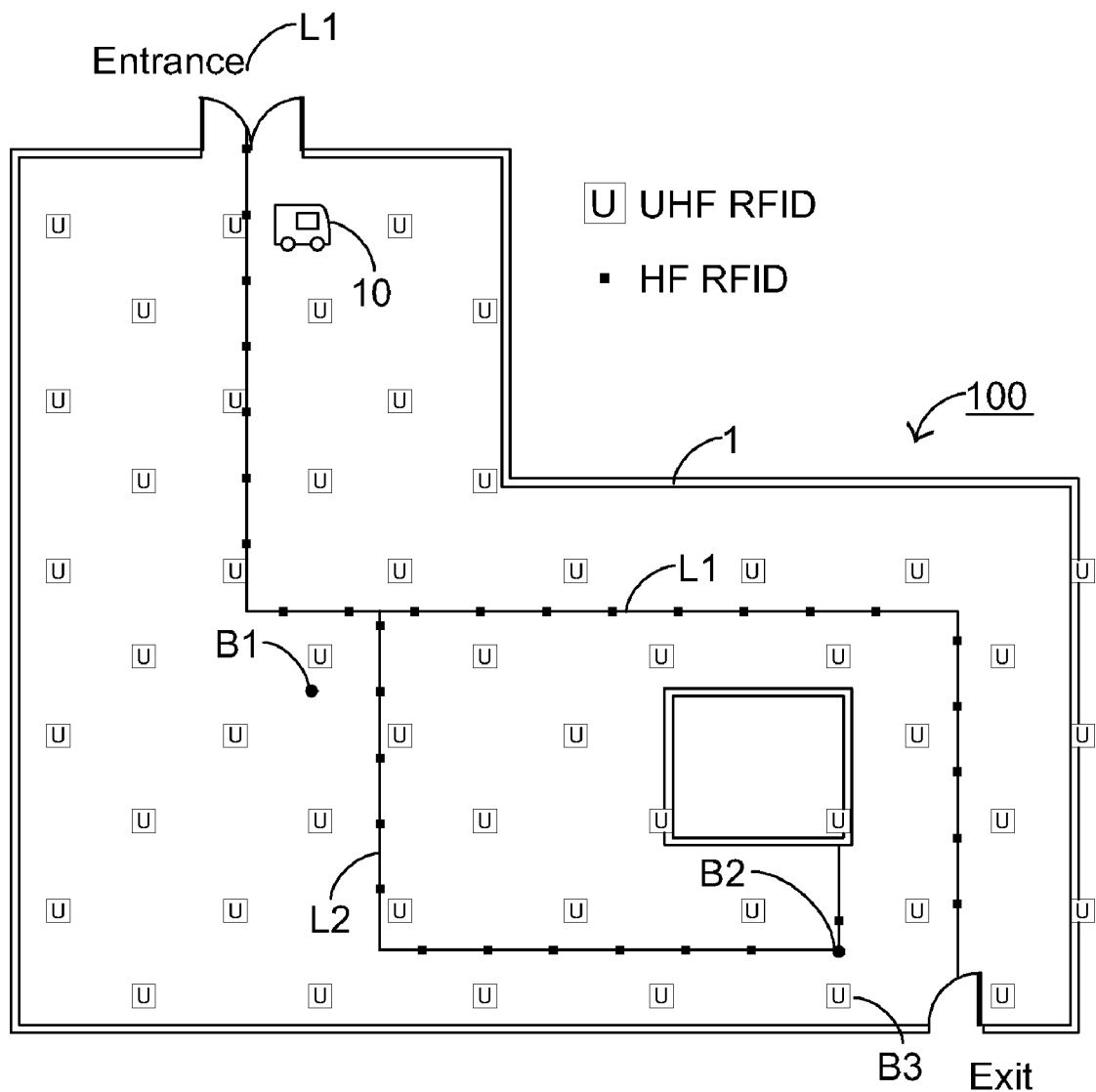
FIG. 5 is a schematic diagram of the identification tag positioning and navigation system 100 in accordance with a second embodiment of the present invention.
Figure 6:
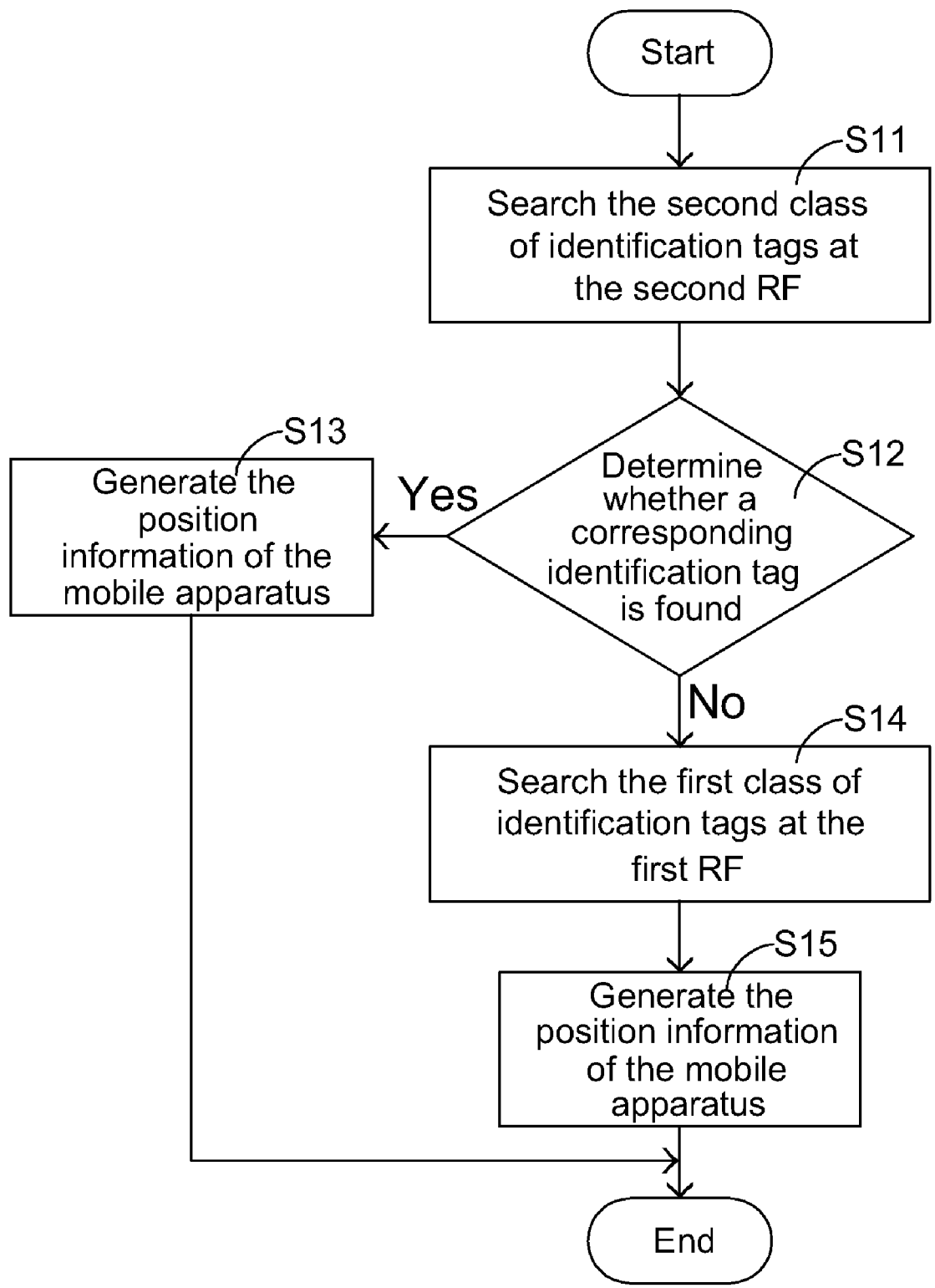
FIG. 6 is a flow chart of positioning in accordance with the second embodiment of the present invention.

Take a second embodiment as an example to describe an application of an identification tag positioning and navigation method according to the present invention. In a large-scale factory building or an area having a highly complicated layout environment, an automated machine such as a robot obtains position information and moves on a predetermined route. Refer to FIG. 5 showing a schematic diagram of the identification tag positioning navigation system 100 in accordance with the second embodiment of the present invention. Refer to FIG. 6 showing a flow chart of positioning identification tags in accordance with the second embodiment of the present invention. In this embodiment, the mobile apparatus 10 is an automated machine or vehicle. In another embodiment, a mobile apparatus according to the present invention is built in a common automated vehicle. At this point, the mobile apparatus 10 is designed to move automatically from a predetermined position to another position, such as moving from the entrance to the exit of the indoor area 1. In the second embodiment, the RF (UHF) and the RF (HF) are alternately used, and the identification tags provided in the indoor area 1 comprise a first class of UHF identification tags and a second class of HF identification tags.

Referring to FIG. 5, the mobile apparatus 10 is near the entrance of the indoor area 1. Referring to FIG. 6, in Step S11, the mobile apparatus 10 operates at the RF (HF) to access the second class of identification tags in the indoor area 1. In Step S12, it is determined whether the corresponding second class of identification tags is found. When the answer of Step S12 is yes, Step S13 is performed. In Step S13, position information of the mobile apparatus 10 is obtained. Being similar to a corresponding step of the first embodiment, in Step S13, the position information is directly defined or is averaged according to unique position data of one or a plurality of identification tags. Since the identification tags in the second class are arranged tightly one next to another and have short scan range, the identification tags may not be found in Step S12. In this embodiment, when the second class of the identification tags can not be accessed by scanning at the RF (HF), Step S14 is performed. In Step S14, the first class of the identification tags in the indoor area 1 is accessed by scanning at the RF (UHF). The RF (UHF) has a larger scan range, and consequently the corresponding first class of identification tags is effectively found according to the present invention. With respect to obtaining the position information of the mobile apparatus 10, the description is similar to the foregoing Step S13 and the first embodiment.

Figure 7:
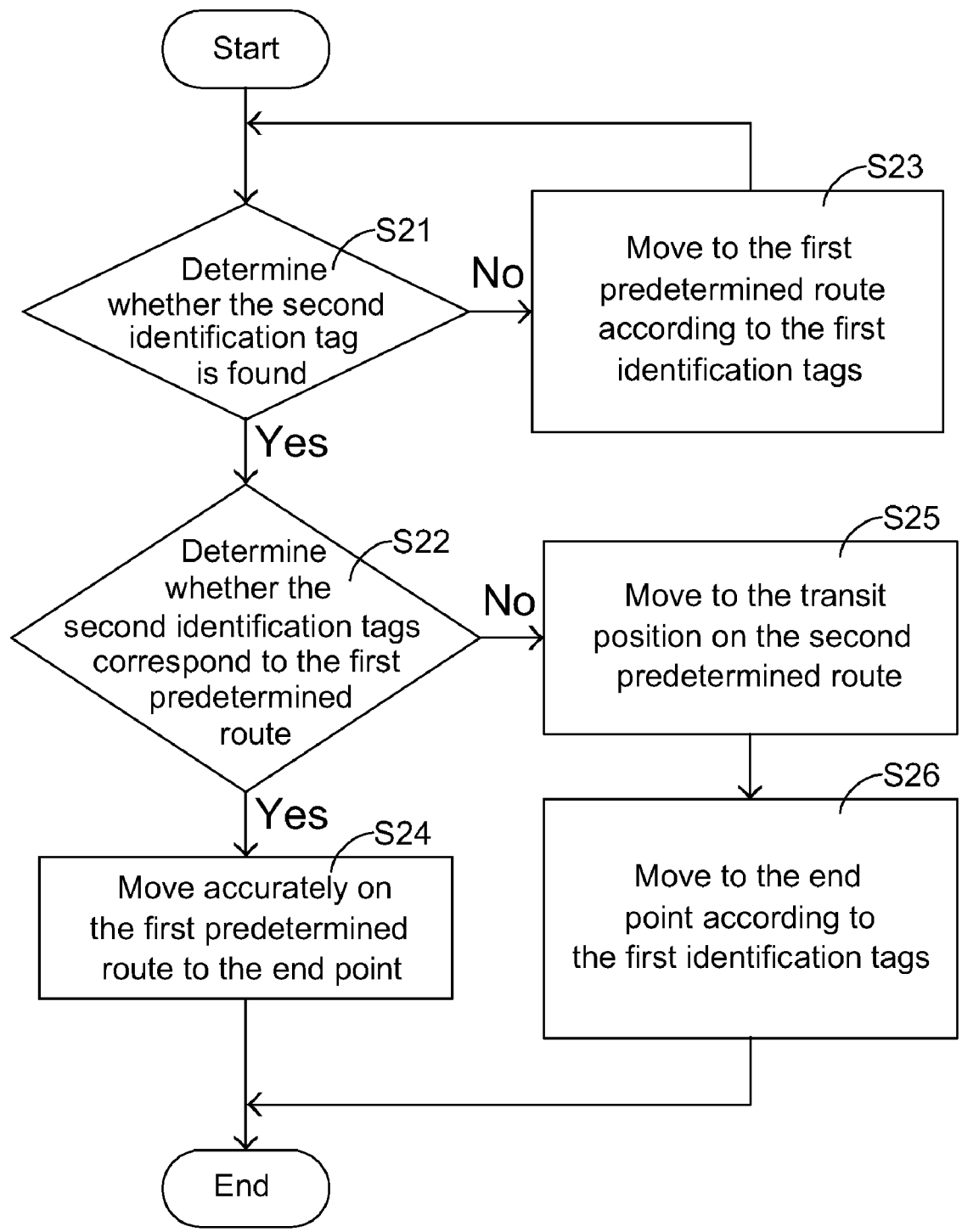
FIG. 7 is a flow chart of navigation in accordance with the second embodiment of the present invention.

FIG. 7 is a flow chart of navigation in accordance with the second embodiment of the present invention. In this embodiment, the mobile apparatus 10, capable of moving automatically, can move accurately on a predetermined route in a large-scale factory building or an area having a highly complicated layout environment. The mobile apparatus 10 moves automatically on a first predetermined route L1 (shown in FIG. 5) of the indoor area 1, which is from the entrance to the exit of the indoor area 1. Furthermore, the mobile apparatus 10 operates at the RF (HF) to access and search for the second class of the identification tags. In Step S21, it is determined whether the second class of the identification tags is found. When the answer of Step S21 is yes, Step S22 is performed; otherwise, Step S23 is performed. In Step S22, when the second class of the identification tags as found corresponds to the first predetermined route L1, the mobile apparatus 10 moves directly and automatically on the first predetermined route L1 according to unique position data of the second class of the identification tags, which is tightly arranged one next to another. In Step S24, the mobile apparatus 10 moves accurately on the first predetermined route L1 to an end point such as the exit of the indoor area 1.

As mentioned above, when the mobile apparatus 10 first fails to scan the corresponding second class of the identification tags, the mobile apparatus 10 fails to find the first predetermined route L1. Accordingly, in Step S23, the mobile apparatus 10 operates at a RF (UHF) to access and to find the first class of the identification tags. At this point, the first class of the identification tags stores data associated with the second class of the identification tags. For example, the data is a coordinate position of a nearest second class of the identification tag. Therefore, the mobile apparatus 10 moves automatically to the first predetermined route L1 according to the first class of identification tags, or move to a second predetermined route L2 near the first class of the identification tags. Referring to FIG. 5, the mobile apparatus 10 may be at a position B1, and accordingly, one of the first class of the identification tags near the position B1 indicates the second class of the identification tags corresponding to the second predetermined route L2.

As mentioned above, the mobile apparatus 10 moves accurately on the second predetermined route L2 of the indoor area 1. However, in this embodiment, an end point of the second predetermined route L2 is not the first predetermined route L1, such that a motion link is needed. Consequently, when it is determined that in Step S22, the second class of the identification tags do not correspond to the first predetermined route L1 but the second predetermined route L2 nearby, the mobile apparatus 10 only moves automatically to a transit position B2 of the second predetermined route L2 according to a description of unique position data of the second class of the identification tags, which are arranged tightly one next to another and corresponding to the second predetermined route L2. In Step S25, the transit position B2 is generated according to a coordinate of a position near to the end point of the first predetermined route L1. The mobile apparatus 10 then operates at the first RF (UHF) to access and search for the first class of the identification tags near the transit position B2. Take an identification tag on a position B3 as an example. In Step S26, the mobile apparatus 10 implements a straight line method or a minimum distance method to automatically move to the end point of the first predetermined route L1 according to a coordinate of the identification tag at the position B3 and a coordinate of the end point of the first predetermined route L1. The end point is the exit of the indoor area 1.

In conclusion, positioning information and a further navigation service are effectively obtained in a common indoor area using a positioning system and method according to the invention. Regardless of a walking motion of an ordinary user or an automatic motion of an associated vehicle, compared to a positioning and navigation capability of a conventional global positioning system (GPS), more operation accuracy in space is provided according to the present invention. Moreover, capabilities that are not achieved by a part of the GPS technology are obtained and user specified application requirements are satisfied according to the present invention. Therefore, the abovementioned problems of the prior art are solved and the main object of the present invention is successfully achieved.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A positioning and navigation method for utilizing a mobile apparatus and a plurality of identification tags deployed in an area, wherein each identification tag has a position data, said method comprising steps of:
   accessing position data of a first identification tag in a first radio frequency (RF) of the identification tags; and
   generating position information of the mobile apparatus according to the position data of the first identification tag and a geographic data of the area;
   wherein, the position data of each identification tag represents a coordinate location of each identification tag in the geographic data of the area; and
   wherein the step of accessing the position data of the first identification tag of the identification tags comprises:
      detecting a second identification tag in a second radio frequency; and
      if the second identification tag is present, accessing the position data of the second identification tag ; otherwise, accessing the position data of the first identification tag;
      wherein the first radio frequency is ultra high frequency (UHF) band, and the second radio frequency is high frequency (HF) band.

2. The positioning and navigation method as claimed in claim 1, wherein the plurality of identification tags comprise said first identification tag in said first radio frequency and a second identification tag in a second radio frequency.

3. The positioning and navigation method as claimed in claim 1, wherein the step of generating the position information of the mobile apparatus according to the position data of the first identification tag and the geographic data of the area, further comprises:
   accessing a third identification tag in said first radio frequency;
   obtaining an average for the position data of the first identification tag and the third identification tag; and
   setting the average as position information of the mobile apparatus.

4. The positioning and navigation method as claimed in claim 1, further comprising:
   generating navigation information according to a predetermined destination data, the position information of the mobile apparatus, and the geographic data;
   generating indication information according to the navigation information; and
   generating one of image, audio and video instruction according to the indication information.

5. The positioning and navigation method as claimed in claim 1, further comprising:
   if only the position data of the first identification tag is accessed, generating a route to move the mobile apparatus to a predetermined route according to the position data of the first identification tag, the predetermined route, and the geographic data of the area;
   wherein the predetermined route is comprised by the second identification tag.

* * * * *